United States Patent
Bacon (10) Patent No.: US 6,764,125 B2
(45) Date of Patent: Jul. 20, 2004

(54) PROP ASSEMBLY FOR VEHICLE BED COVERS AND THE LIKE

(75) Inventor: Bruce C. Bacon, Rockford, MI (US)

(73) Assignee: Bauer Products, Inc., Grand Rapids, MI (US)

( * ) Notice: Subject to any disclaimer, the term of this patent is extended or adjusted under 35 U.S.C. 154(b) by 0 days.

(21) Appl. No.: 10/289,062

(22) Filed: Nov. 6, 2002

(65) Prior Publication Data

US 2004/0084928 A1 May 6, 2004

(51) Int. Cl.⁷ .................................................. B60P 7/02
(52) U.S. Cl. ............................ 296/100.08; 296/100.06
(58) Field of Search ............................. 296/174, 26.07, 296/100.08, 100.1, 100.17, 100.06; 49/339, 340, 345

(56) References Cited

U.S. PATENT DOCUMENTS

| | | | |
|---|---|---|---|
| 3,747,271 A | 7/1973 | Adamski | |
| 4,735,018 A | 4/1988 | Duncan et al. | |
| 6,041,548 A | 3/2000 | Miller | |
| 6,186,580 B1 | 2/2001 | Nothem et al. | |
| 6,212,827 B1 | 4/2001 | Miller | |
| 6,340,194 B1 * | 1/2002 | Muirhead et al. | 296/100.06 |
| 6,343,828 B1 | 2/2002 | Young et al. | |
| 6,382,700 B2 | 5/2002 | Young et al. | |
| 2002/0005651 A1 | 1/2002 | Young et al. | |

OTHER PUBLICATIONS

Bearcat Corporation, ""Sno–Cap", Published before Nov. 5, 2001," Bearcat Corporation (809 Logan Street, Goshen, IN 46528), and related sales documents, 6 pages.

Trailite Sales, Inc., ""Triton Aluminum Trailers", One–Piece Fold–Out with 6 printed panels, Published before Nov. 5, 2001," Trailite Sales, Inc. (Hartford, WI 53027), 6 pages.

Photographs of "Bearcat" brand Lift Assist Arm for Smowmobile Trailers manufactured and sold before Nov. 5, 2002 by Bearcat Corporation of Goshin, Indiana, 7 pages.

\* cited by examiner

Primary Examiner—D. Glenn Dayoan
Assistant Examiner—Jason Morrow
(74) Attorney, Agent, or Firm—Price, Heneveld, Cooper, DeWitt & Litton, LLP (57) ABSTRACT

A prop assembly for vehicle bed covers and the like comprises an L-shaped lower arm and a straight upper arm, each of which have a spring mount disposed between opposite ends thereof. The upper and lower arms are pivotally interconnected at adjacent ends in a manner which positions the arms in a vertically aligned relationship. Brackets pivotally connect the lower end of the lower arm with the vehicle bed, and the upper end of the upper arm with the cover. A longitudinally extending spring is disposed in a vertically aligned relationship with the lower and upper arms, and has opposed ends thereof pivotally connected with the spring mounts, such that outwardly extending biasing force generated by the spring assists in lifting the cover from the closed position and retains the cover in the open position.

30 Claims, 5 Drawing Sheets

PROP ASSEMBLY FOR VEHICLE BED COVERS AND THE LIKE

BACKGROUND OF THE INVENTION

The present invention relates to spring biased linkage mechanisms, and in particular to a prop assembly for vehicle bed covers and the like.

Prop assemblies are used in a variety of applications to retain an associated closure in an open position. For example, in vehicles, hoods, truck lids, hatchbacks, pickup bed covers and the like are often equipped with a spring biased prop assembly which assists the user in lifting the lid from a closed position to an open position, and supports the lid in the open position.

U.S. Pat. Nos. 6,041,548 and 6,212,827 disclose a support arm mechanism that is specifically designed to support a hinged lid for a pickup truck bed. However, such support arm designs include upper and lower arms that are aligned in a laterally spaced apart relationship, with a gas spring positioned therebetween. Such designs require rather substantial lateral space for installation, as well as separate left and right handed assemblies for installation on the opposite sides of the vehicle bed. Furthermore, such support arms have typically been connected directly to the vehicle bed and associated cover, such that the prop mechanism cannot be easily removed when the cover is removed from the vehicle.

SUMMARY OF THE INVENTION

One aspect of the present invention is a prop assembly for vehicle bed covers and the like of the type shaped to selectively cover an open bed portion of a vehicle, with one end thereof pivotally connected with the vehicle to permit shifting the cover between open and closed positions, and an opposite end thereof with a releasable latch to selectively secure the cover to the vehicle in the closed position. The prop assembly includes a lower arm having a generally L-shaped side elevational configuration, a tubular construction, upper and lower ends, and a first spring mount disposed a predetermined distance between the upper and lower ends of the lower arm. An upper arm is also provided, having a generally straight side elevational configuration, a tubular construction, upper and lower ends, and a second spring mount disposed a predetermined distance between the upper and lower ends of the upper arm. The lower end of the upper arm is pivotally connected with the upper end of the lower arm in a manner which positions the upper and lower arms in a vertically aligned relationship. A vehicle bed mounting bracket configured for connection with the vehicle is pivotally connected with the lower end of the lower arm. A vehicle cover mounting bracket configured for connection with the cover is pivotally connected with the upper end of the upper arm. A longitudinally extending spring is disposed in a vertically aligned relationship with the lower and upper arms, and has one end thereof pivotally connected with the first spring mount, and an opposite end thereof pivotally connected with the second spring mount, whereby outwardly extending biasing force generated by the spring assists in lifting the cover from the closed position, and retains the cover in the open position.

Yet another aspect of the present invention is a vehicle bed cover of the type shaped to selectively cover an open bed portion of an associated vehicle, and having one end thereof with a hinge for pivotal connection with the vehicle to permit shifting the cover between open and closed positions, and an opposite end thereof with a releasable latch to selectively secure the cover to the vehicle in the closed position. The vehicle bed cover includes a prop assembly, comprising a lower arm having a generally L-shaped side elevational configuration, a tubular construction, upper and lower ends and a first spring mount disposed a predetermined distance between the upper and lower ends of the lower arm. The prop assembly also includes an upper arm having a generally straight side elevational configuration, a tubular construction, upper and lower ends, and a second spring mount disposed a predetermined distance between the upper and lower ends of the upper arm. The lower end of the upper arm is pivotally connected with the upper end of the lower arm in a manner which positions the upper and lower arms in a vertically aligned relationship. A vehicle bed mounting bracket configured for connection with the vehicle is pivotally connected with the lower end of the lower arm. A vehicle cover mounting bracket is mounted on the cover, and is pivotally connected with the upper end of the upper arm. A longitudinally extending spring is disposed in a vertically aligned relationship with the lower and upper arms, and has one end thereof pivotally connected with the first spring mount, and an opposite end thereof pivotally connected with the second spring mount, whereby outwardly extending biasing force generated by the spring assists in lifting the cover from the closed position, and retains the cover in the open position.

The prop assembly arms and spring are vertically aligned to provide a streamlined and compact construction that is non-handed, such that the same can be installed on either side of the vehicle bed. The ends of the arms are detachably connected with their associated mounting brackets so that the prop assembly can be completely detached when the vehicle bed cover is removed from the vehicle. The arms are preferably constructed from square tubing and are interconnected at a clevis joint to provide improved lateral and vertical stability and strength. The prop assembly has an uncomplicated design that can be quickly and easily assembled, is efficient in use, economical to manufacture, capable of a long operating life, and particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
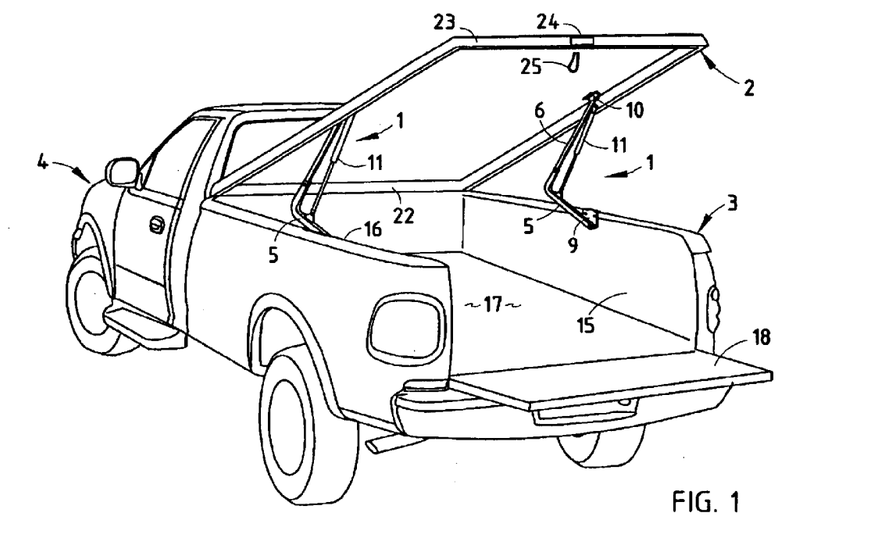
FIG. 1 is a perspective view of a vehicle having a bed cover and a pair of prop assemblies embodying the present invention.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
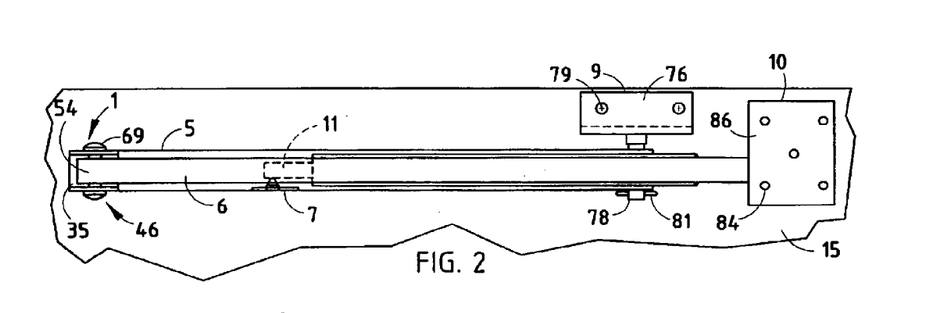
FIG. 2 is a top plan view of one of the prop assemblies.

The reference numeral 1 (FIG. 1) generally designates a prop assembly for vehicle bed lids or covers and the like, such as the cover 2 shown in FIG. 1, which is shaped to selectively cover the bed 3 of a pickup truck 4. Prop assembly 1 comprises a generally L-shaped lower arm 5 and a generally straight upper arm 6, each having a spring mount 7, 8 disposed between opposite ends thereof. Upper and lower arms 6 and 5 are pivotally interconnected at adjacent ends in a manner which positions the arms in a vertically aligned relationship, as best shown in FIG. 2. Brackets 9 and 10 pivotally connect the lower end of lower arm 5 with the vehicle bed 3, and the upper end of upper arm 6 with cover 2. A longitudinally extending biasing member or spring 11 is disposed in a vertically aligned relationship with lower and upper arms 5 and 6 and spring mounts 7 and 8, such that outwardly extending biasing force generated by spring 11 assists in lifting cover 2 from the closed position, and retains cover 2 in the open position shown in FIG. 1.

The illustrated pickup truck 4 has a generally conventional construction, wherein bed 3 is normally open, and defined by a pair of sidewalls 15 and 16 with a floor 17 extending therebetween. A pivoting tailgate 18 is hingedly attached to the rear of pickup truck 4, and is pivoted to selectively close the open end of pickup truck bed 3.

The illustrated cover 2 is in the nature of a cap or lid, having a width and length substantially commensurate with the width and length of pickup truck bed 3 to selectively cover the upper portion thereof. The illustrated cover 2 has a generally conventional construction in the nature of a substantially flat rigid panel having a forward end 22 thereof pivotally connected to the forward portion of pickup truck bed 3 by hinges (not shown) or other similar pivoting mechanisms. Consequently, cover 2 can be pivoted in a generally vertical plane between the open position shown in FIG. 1, which provides access to the contents of pickup truck bed 3, and a closed position, wherein cover 2 assumes a generally horizontal orientation and is abuttingly supported on the upper edges of the sidewalls 15 and 16 of pickup truck 4. The rearward end 23 of cover 2 includes a releasable latch 24, which selectively secures cover 2 to pickup truck 4 in the closed position. As described in greater detail hereinafter, a pair of prop assemblies 1 are attached to the opposite sides of pickup truck bed 3 and cover 2 adjacent the rearward end 23 thereof, and serve to assist in lifting cover 2 from the closed position, and retain cover 2 in the open position shown in FIG. 1. In the illustrated example, a strap 25 is attached to the lower surface of cover 2 adjacent the rearward end 23 thereof, and is configured for manual grasping to assist in pulling cover 2 downwardly from the open position to the closed position.

The illustrated prop assemblies 1 have a substantially identical construction. As best shown in FIGS. 8–11, lower arm 5 has a generally L-shaped side elevational configuration, comprising a straight first portion 30 and a straight second portion 31 mutually oriented at an obtuse included angle at a juncture 32. The lower end 33 of lower arm 5 includes a lateral through aperture 34 for pivotally attaching prop assembly 1 to spring mount 7 in the manner described in greater detail hereinafter. The upper end 35 of lower arm 5 also includes a laterally extending through aperture 36 which serves to pivotally connect lower arm 5 with upper arm 6 as described in greater detail hereinafter. Spring mount 7 is disposed on the first portion 30 of lower arm 5 a predetermined distance between juncture 32 and the lower end 33 of lower arm 5. In the illustrated example, the distance between spring mount 7 and juncture 32 is in the range of 10 to 25 percent of the distance between spring mount 7 and aperture 34. In one working embodiment of the present invention, the first portion 30 of lower arm 5 has a length of around 12.5 inches, while the second portion 31 has a length of around 4.5 inches, wherein the horizontal distance between the centerline of spring mount 7 and aperture 34 is around 9.72 inches, and the horizontal distance between the centerline of spring mount 7 and aperture 36 is around 3.7 inches, such that the included angle between the first and second portions 30 and 31 is in the range of 104 to 105 degrees.

Figures 7, 8, 9, 10:
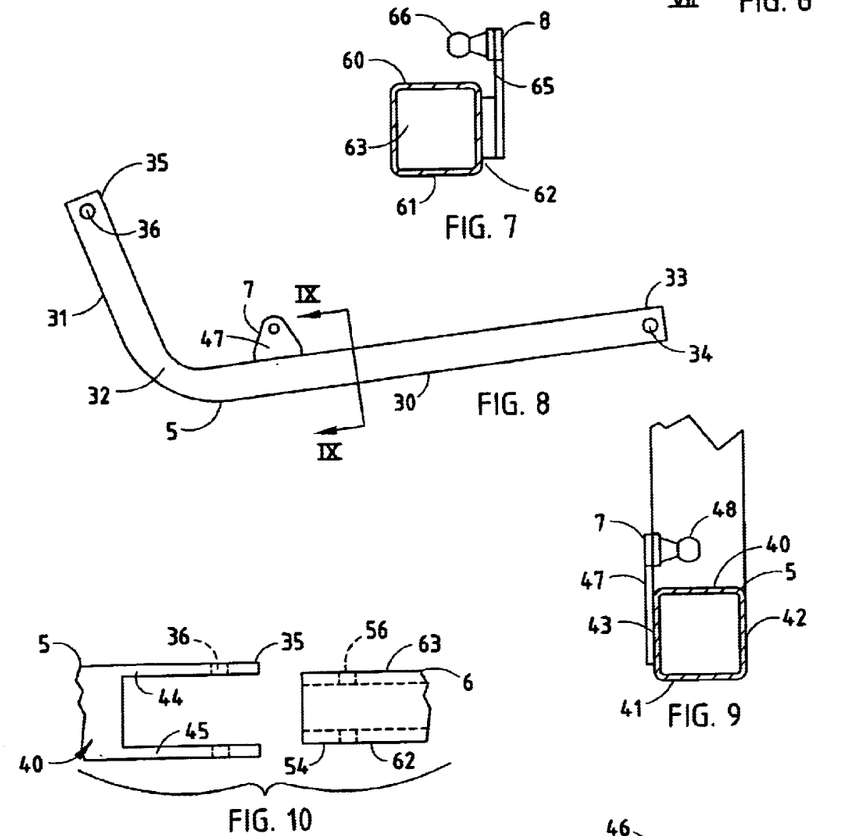
FIG. 7 is a lateral cross-sectional view of the upper arm, taken along the line VII—VII, FIG. 6.
FIG. 8 is a side elevational view of a lower arm portion of the prop assembly.
FIG. 9 is a lateral cross-sectional view of the lower arm, taken along the line IX—IX, FIG. 8.
FIG. 10 is a fragmentary, exploded top plan view of the upper end of the lower arm and the lower end of the upper arm.
Figure 11:
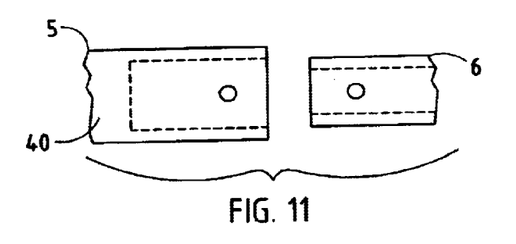
FIG. 11 is a fragmentary, exploded side elevational view of the lower end of the upper arm and the upper end of the lower arm, as shown in FIG. 10.
Figure 12:
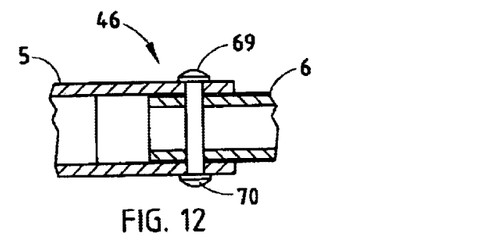
FIG. 12 is a fragmentary, cross-sectional view of the upper arm and lower arm interconnected in a clevis joint.

Lower arm 5 preferably has a tubular construction, which in the illustrated example has a square-shaped lateral cross-sectional configuration defined by upper and lower faces 40 and 41 and opposite side faces 42 and 43. Apertures 34 and 36 extend laterally through both side faces 42 and 43 of lower arm 5. As best shown in FIGS. 10–12, at the upper end 35 of lower arm 5, the upper and lower faces 40 and 41 are cut away adjacent aperture 36 to create a pair of parallel flange portions 44 and 45 that define the male portion of the clevis joint 46, which securely, yet pivotally, interconnects lower arm 5 with upper arm 6, as described below. The illustrated spring mount 7 includes a generally flat mounting plate 47 that is fixedly attached to side face 43 of lower arm 5, and includes a laterally extending ball stud 48 that is shaped for reception in an associated socket portion of spring 11. In one working embodiment of the present invention, lower arm 5 is constructed from one inch square tubing, with ball stud 48 located approximately 0.40–0.50 inches upwardly from the upper face 40 of lower arm 5.

Figure 6:
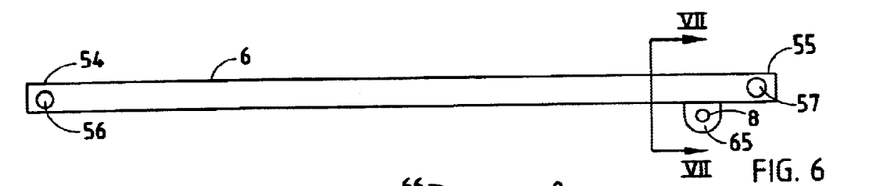
FIG. 6 is a side elevational view of an upper arm portion of the prop assembly.

As best illustrated in FIGS. 6 and 7, the illustrated upper arm 6 has a generally straight side elevational configuration, with a lower end 54 and an upper end 55. Upper arm 6 includes a laterally extending aperture 56 for pivotally connecting upper arm 6 with lower arm 5. Upper arm 6 also includes a laterally extending aperture 57 disposed adjacent upper end 55 for pivotally connecting upper arm 6 with bracket 10, as described in greater detail hereinafter. Spring mount 8 is disposed a predetermined distance between the lower and upper ends 54 and 55 of upper arm 6. The illustrated spring mount 8 is located around one to two inches from aperture 57. In one working embodiment of the present invention, upper arm 6 has a total length of around 17.9 inches, wherein apertures 56 and 57 are located approximately a ½ inch from the ends of upper arm 6, and the centerline of spring mount 8 is disposed around 1.125 inches from the center of aperture 57.

Preferably, upper arm 6 also has a tubular construction somewhat similar to that of lower arm 5. In the illustrated example, upper arm 6 is constructed from a length of square tubing defined by upper and lower faces 60 and 61 (FIG. 7) and opposite side faces 62 and 63. Apertures 56 and 57 extend laterally completely through both side faces 62 and 63 of upper arm 6. The width of upper arm 6 is preferably somewhat smaller than the width of lower arm 5, so that the lower end 54 of upper arm 6 can be received within the interior of lower arm 5. In the illustrated example, the lower end 54 of upper arm 6 defines the male half of clevis joint 46, and is received closely between the flange portions 44 and 45 of lower arm 5 as described in greater detail below. The illustrated spring mount 8 is similar to spring mount 7, and includes a mounting plate 65 that is fixedly attached to the side face 62 of upper arm 6, and includes a laterally extending ball stud 66 shaped to be received within a socket on spring 11. In one working embodiment of the present invention, upper arm 6 is constructed from ¾ inch square tubing, and ball stud 66 is located a distance of approximately 0.45 inches above the upper face 60 of upper arm 6.

With reference to FIGS. 10–12, clevis joint 46 provides a very secure pivotal interconnection between lower arm 5 and upper arm 6, which has improved lateral stability, as well as a very streamlined and compact construction. As noted above, the lower end 54 of upper arm 6 is shaped to be closely received between the flange portions 44 and 45 of lower arm 5, and positioned so that apertures 56 in upper arm 6 align laterally with the apertures 36 in lower arm 5. As shown in FIG. 12, a rivet 69 is inserted through laterally aligned apertures 36 and 56 to positively, yet pivotally, interconnect the lower end 54 of upper arm 6 with the upper ends 35 of lower arms 5. The free end 70 of rivet 69 is deformed into a head shape which results in close sliding contact between the side surfaces 62 and 63 of upper arm lower end 54 and the interior surfaces of the flange portions 44 and 45 on lower arm 5. This close sliding contact retains lower arm 5 and upper arm 6 in a coplanar condition, which when attached to a vehicle, results in vertical alignment of lower arm 5 and upper arm 6.

Figure 13:
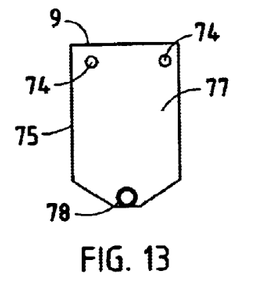
FIG. 13 is a front elevational view of a vehicle bed mounting bracket.
Figure 14:
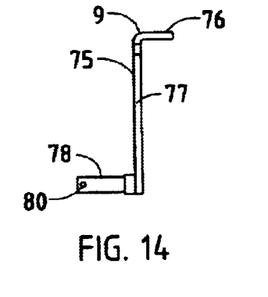
FIG. 14 is a side elevational view of the vehicle bed mounting bracket.
Figure 15:
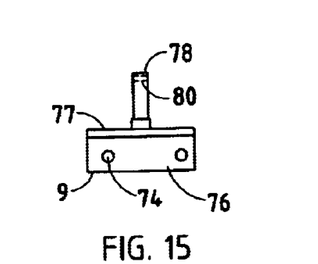
FIG. 15 is a bottom plan view of the vehicle bed mounting bracket.
Figure 20:
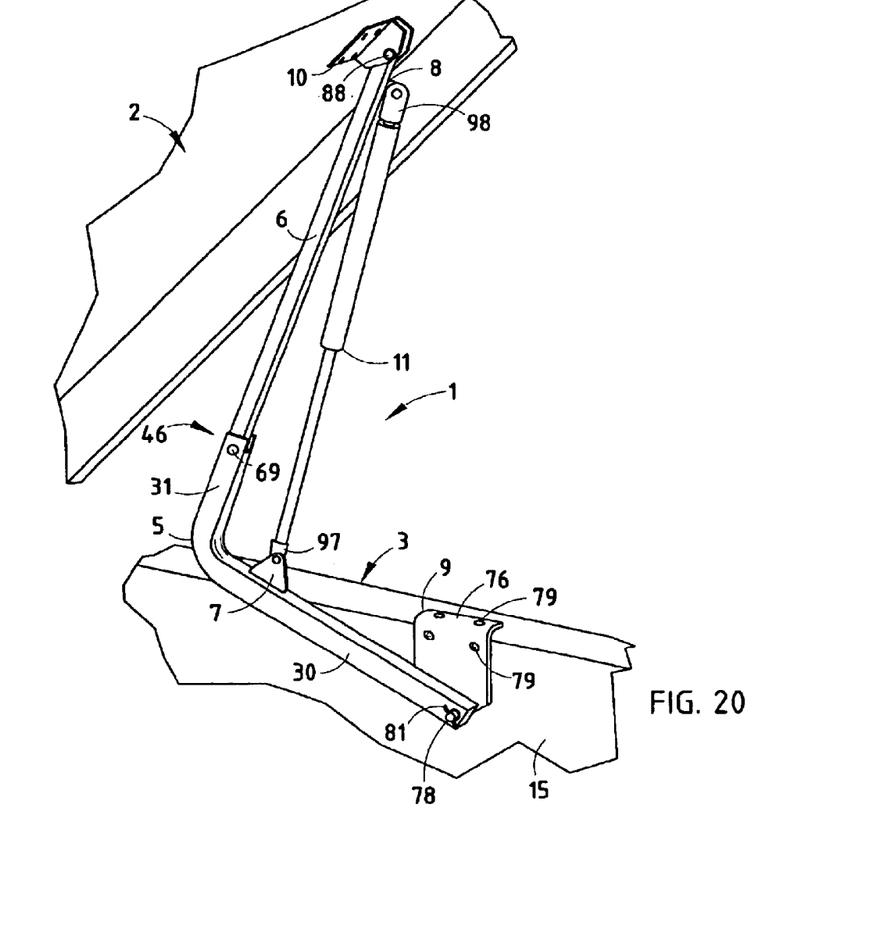
FIG. 20 is a fragmentary, perspective view of the vehicle bed mounting bracket pivotally interconnecting the vehicle bed with the prop assembly.

Bracket 9 (FIGS. 13–15) pivotally connects the lower end 33 of lower arm 5 with pickup truck bed 3. In the illustrated example, vehicle bed mounting bracket 9 includes an L-shaped plate 75 defined by a horizontally extending flange 76 and a flange 77 depending vertically therefrom. A laterally extending pin 78 is attached to flange 77 adjacent the lower end thereof, and is shaped to be closely received within the apertures 34 in the lower end 33 of lower arm 5. The illustrated flanges 76 and 77 include fastener apertures 74. As best illustrated FIG. 20, the upper flange 76 of plate 75 is configured to be abuttingly supported on the upper edge of pickup truck sidewalls 15 and 16, and bracket 9 is secured to vehicle bed 3 by conventional fasteners 79. Pin 78 extends laterally inwardly toward the interior of pickup truck bed 3, and has a length slightly greater than the width of lower arm 5. Preferably, a detachable retainer is mounted on the terminal end of pin 78 to positively interconnect the lower end 33 of lower arm 5 with vehicle bed mounting bracket 9. In the illustrated example, a through aperture 80 is provided adjacent the terminal end of pin 78, and receives a retainer pin 81 therethrough.

Figure 16:
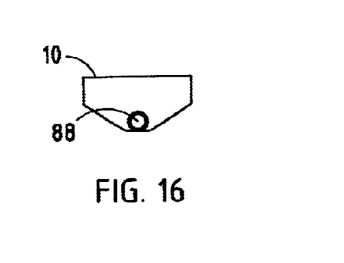
FIG. 16 is a front elevational view of a vehicle cover mounting bracket.
Figure 17:
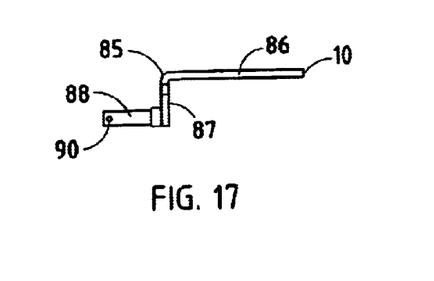
FIG. 17 is a side elevational view of the vehicle cover mounting bracket.
Figure 18:
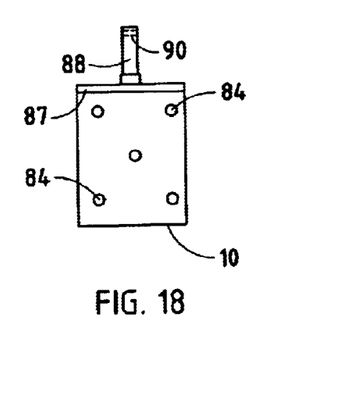
FIG. 18 is a bottom plan view of the vehicle cover mounting bracket.
Figure 19:
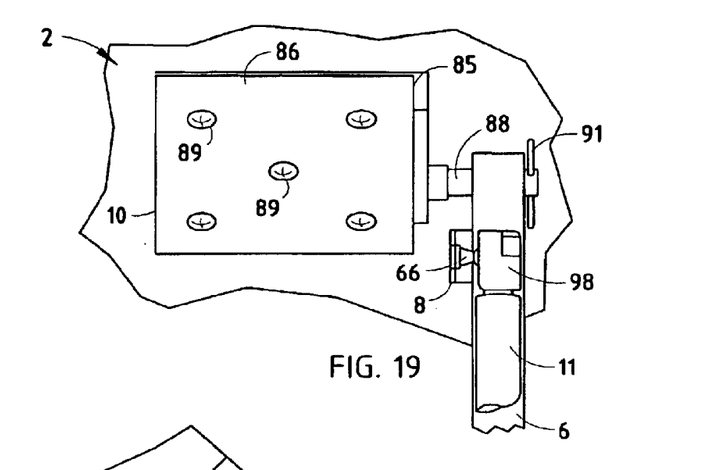
FIG. 19 is a fragmentary, perspective view of the vehicle cover mounting bracket interconnecting the cover with the prop assembly.

The illustrated vehicle cover mounting bracket 10 (FIGS. 16–18) is somewhat similar in construction to the previously described vehicle bed mounting bracket 9, and includes a plate 85 having a horizontal flange 86 adapted for attachment to the interior surface of cover 2, and a vertically depending flange 87 disposed generally perpendicularly with horizontal flange 86. A mounting pin 88 extends laterally from flange 87 adjacent the lower end thereof and is shaped to be closely received within aperture 57 of upper arm 6. The illustrated flange 86 includes fastener apertures 84. As best illustrated in FIG. 19, conventional fasteners 89 attach the horizontal flange 86 of plate 85 to the interior or lower surface of cover 2. Mounting pin 88 extends outwardly toward the side edge of cover 2 and is received into the apertures 57 on the upper end 55 of upper arm 6. A through aperture 90 is provided adjacent the terminal end of pin 88, and is shaped to receive a removable retainer pin 91 therein.

Figures 4, 5:
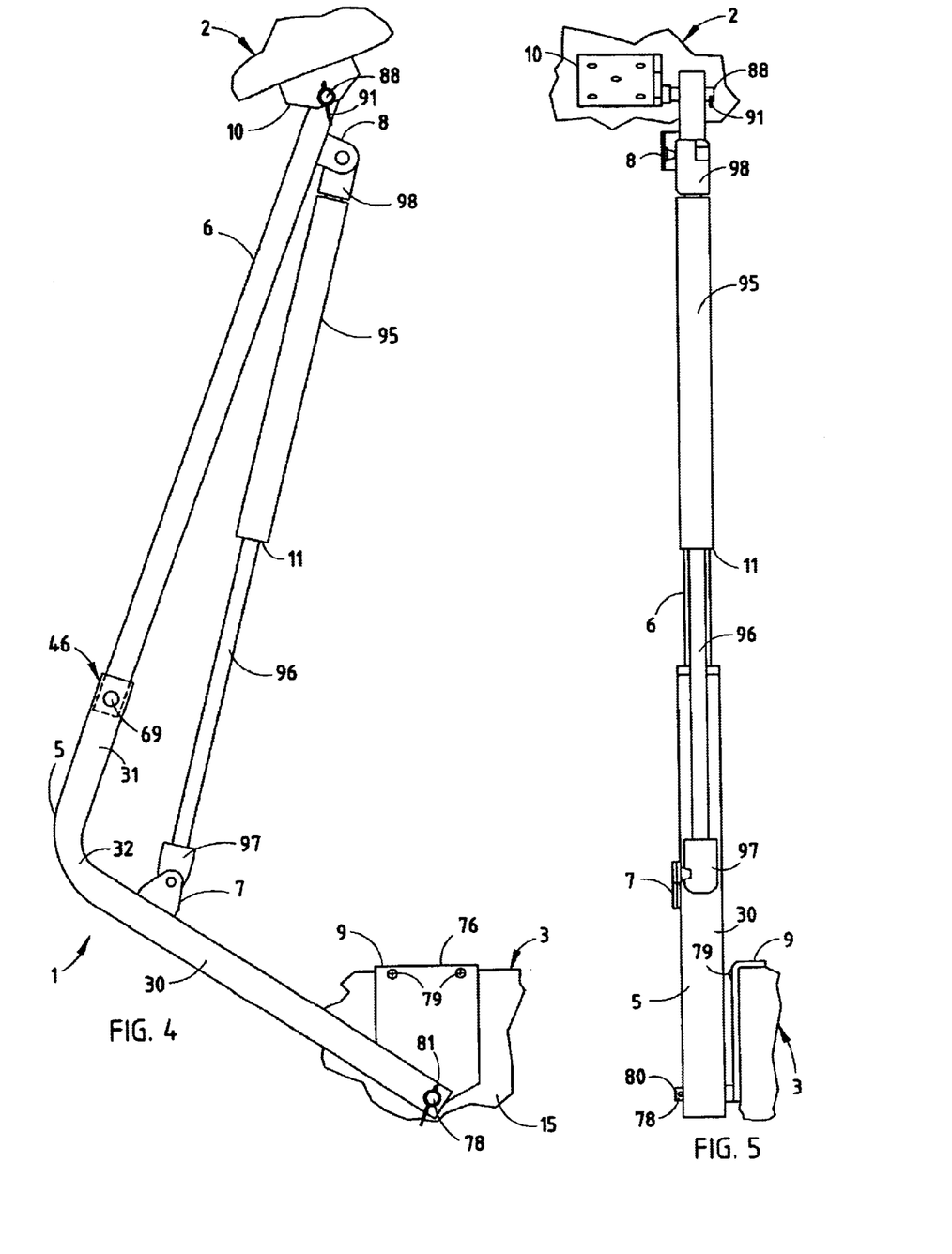
FIG. 4 is a side elevational view of the prop assembly, shown in a fully extended position.
FIG. 5 is a side elevational view of the prop assembly in the fully extended position shown in FIG. 4.

The illustrated longitudinally extending spring 11 (FIGS. 4 and 5) is in the nature of a gas spring, and includes a cylindrical housing 95 in which a reciprocating rod 96 is mounted. The free end of rod 96 includes a connector 97, which has a ball-shaped socket (not shown) to closely receive ball stud 48 therein to pivotally connect the rod end of spring 11 with spring mount 7 on lower arm 6. Similarly, the outer end of housing 95 includes a connector 98 with a ball-shaped socket (not shown) to closely receive ball stud 66 on spring mount 8. Spring 11 is designed to outwardly bias rod 96, and is preferably selected in accordance with the weight and design of a specific cover 2, so as to assist in shifting cover 2 from the closed to the open position, and retain cover 2 in the open position shown in FIG. 1. In one working embodiment of the present invention, spring 11 has around 100–150 pounds of lifting force.

In operation, a pair of prop assemblies 1 are mounted to the pickup truck bed 3 and cover 2 in the following fashion. A pair vehicle bed mounting brackets 9 are attached to the sidewalls 15 and 16 of pickup truck 4, adjacent the rearward end thereof in the manner illustrated in FIG. 20. The longitudinal position of vehicle bed mounting brackets 9 is selected in accordance with the weight and design of cover 2. The mounting pins 78 on brackets 9 are oriented inwardly and are horizontally and vertically aligned or coaxial. A pair of vehicle cover mounting brackets 9 are attached to the interior or lower side of cover 2 adjacent the rearward end 23 thereof with conventional fasteners 89, in the manner illustrated in FIG. 19. The pins 88 of brackets 10 are oriented outwardly, and are preferably coaxial, being aligned both vertically and horizontally. The opposite ends of spring 11 are attached to spring mounts 7 and 8 in the manner described hereinabove. Since spring 11 is biased toward a normally fully extended position, prop assembly 1 will assume the position illustrated in FIG. 4 during assembly.

Apertures 34 at the lower end 33 of lower arm 5 are inserted over inwardly extending pins 78 on vehicle mounting bracket 9, and apertures 57 on the upper end 55 of upper arm 6 are inserted over the outwardly extending pins 88 on vehicle cover mounting brackets 10. Retainer pins 81 and 91 are then inserted through the associated apertures 80 and 90 adjacent the free ends of pins 78 and 88, and serve to securely, yet detachably, mount prop assemblies 1 to the cover 2 and pickup truck bed 3.

Figure 3:
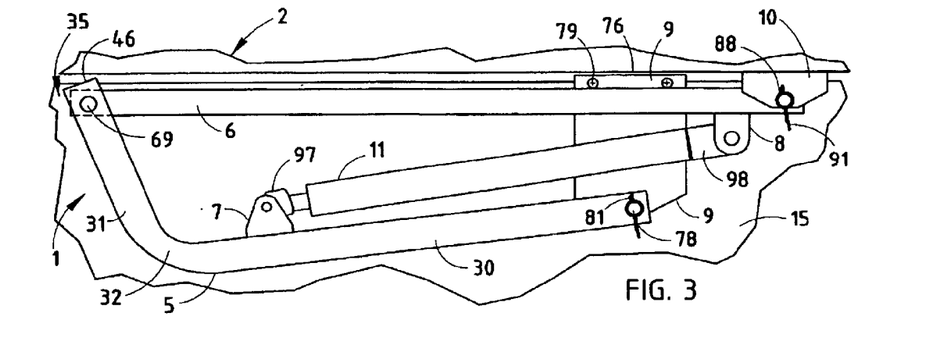
FIG. 3 is a side elevational view of the prop assembly, shown in a fully retracted position.

When cover 2 is in the fully closed position, prop assembly 1 assumes the configuration illustrated in FIG. 3, wherein upper arm 6 is oriented substantially horizontally, and spring 11 is substantially fully retracted. In the example illustrated in FIG. 3, spring 11 is oriented around 8–9 degrees upwardly from the horizontal to provide a positive initial lifting force to counterbalance the weight of cover 2. Latch 24 prevents cover 2 from shifting upwardly. When latch 24 is unlocked, the outwardly biasing force of spring 11 urges the rearward end 23 of cover 2 upwardly, thereby assisting the user in lifting cover 2 to the fully open position illustrated in FIG. 1. The biasing force of spring 11 is sufficient to retain cover 2 in the fully open position. To close cover 2, the user simply grasps strap 25, and pulls downwardly, thereby pivoting the rearward end 23 of cover 2 downwardly against the force of spring 11 until latch 24 is engaged into the locked position.

The vertically aligned orientation of the lower arm 5, upper arm 6 and spring 11 provides prop assembly 1 with a very streamlined and compact design, as well as a non-handed construction that can be used on either side of the vehicle. Brackets 9 and 10 serve to detachably connect prop assembly 1 with cover 2 and pickup truck 4, so that when cover 2 is removed from pickup truck 4, the prop assemblies 1 can also be removed from the vehicle to avoid damage. The square tube construction of lower and upper arms 5 and 6, as well as the interconnecting clevis joint 46, provide improved lateral stiffness.

In the foregoing description, it will be readily appreciated by those skilled in the art that modifications may be made to the invention without departing from the concepts disclosed herein. Such modifications are to be considered as included in the following claims, unless these claims by their language expressly. state otherwise.

What is claimed is:

1. In a vehicle bed cover of the type shaped to selectively cover an open bed portion of an associated vehicle, and having one end thereof with a hinge for pivotal connection with the vehicle to permit shifting said cover between open and closed positions, and an opposite end thereof with a releasable latch to selectively secure said cover to the vehicle in the closed position, the improvement of a prop assembly, comprising:
    a lower arm having a generally L-shaped side elevational configuration, a tubular construction, upper and lower ends, and a first spring mount disposed a predetermined distance between the upper and lower ends of said lower arm;
    an upper arm having a generally straight side elevational configuration, a tubular construction, upper and lower ends, and a second spring mount disposed a predetermined distance between the upper and lower ends of said upper arm; said lower end of said upper arm being pivotally connected with the upper end of said lower arm in a manner which positions said upper and lower arms in a vertically aligned relationship;
    a vehicle bed mounting bracket configured for connection with the vehicle, and pivotally connected with the lower end of said lower arm;
    a vehicle cover mounting bracket mounted on said cover, and pivotally connected with the upper end of said upper arm; and
    a longitudinally extending spring disposed in a vertically aligned relationship with said lower and upper arms, and having one end thereof pivotally connected with said first spring mount, and an opposite end thereof pivotally connected with said second spring mount, whereby outwardly extending biasing force generated by said spring assists in lifting said cover from the closed position, and retains said cover in the open position.

2. A vehicle bed cover as set forth in claim 1, wherein:
said lower end of said upper arm and said upper end of said lower arm are configured to define a clevis joint.

3. A vehicle bed cover as set forth in claim 2, wherein:
said lower end of said lower arm is detachably connected with said vehicle bed mounting bracket; and
said upper end of said upper arm is detachably connected with said vehicle cover mounting bracket, such that said prop assembly may be easily removed from both said cover and the vehicle.

4. A vehicle bed cover as set forth in claim 3, wherein:
said prop assembly defines a first prop assembly positioned on one side of the vehicle adjacent to said opposite end of said cover; and including
    a second prop assembly, substantially identical to said first prop assembly, and positioned on an opposite side of the vehicle adjacent to said opposite end of said cover.

5. A vehicle bed cover as set forth in claim 4, wherein:
said first and second prop assemblies are non-handed and interchangeable for use on either side of the vehicle.

6. A vehicle bed cover as set forth in claim 5, wherein:
said lower arm has a square tubular lateral cross-sectional configuration with a predetermined width; and
said upper arm has a square tubular lateral cross-sectional configuration with a predetermined width that is smaller than the predetermined width of said lower arm, such that the lower end of said upper arm is received within the upper end of said lower arm.

7. A vehicle bed cover as set forth in claim 6, wherein:
said opposite ends of said spring are detachably connected with said first and second spring mounts.

8. A vehicle bed cover as set forth in claim 7, wherein:
said lower end of said lower arm includes a first mounting aperture extending laterally through opposite sidewalls thereof; and
said vehicle bed mounting bracket comprises a laterally extending pin closely received in said first mounting aperture in said lower arm, with a detachable retainer mounted on said pin adjacent a free end thereof.

9. A vehicle bed cover as set forth in claim 8, wherein:
said upper end of said upper arm includes a second mounting aperture extending laterally through opposite sidewalls thereof; and
said vehicle cover mounting bracket comprises a laterally extending pin closely received in said second mounting aperture in said upper arm, with a detachable retainer mounted on said pin adjacent a free end thereof.

10. A vehicle bed cover as set forth in claim 9, wherein:
said lower arm includes first and second portions mutually oriented at an obtuse included angle at a juncture, wherein said first portion is pivotally connected with said vehicle bed mounting bracket, and said second portion is pivotally connected with the lower end of said upper arm; and said first spring mount is disposed on said first portion a predetermined distance between said juncture and the lower end of said lower arm.

11. A vehicle bed cover as set forth in claim 10, wherein:

said first spring mount is disposed a first distance from said juncture and a second distance from the lower end of said lower arm; and said first distance is in the range of 10–25 percent of the second distance.

12. A vehicle bed cover as set forth in claim 11, wherein:

said second spring mount is disposed a predetermined spaced apart distance from the upper end of said upper arm.

13. A vehicle bed cover as set forth in claim 12, wherein:

said predetermined spaced apart distance between said second spring mount and the upper end of said upper arm is in the range of 1–2 inches.

14. A vehicle bed cover as set forth in claim 13, wherein:

said first and second spring mounts each comprise laterally extending ball studs.

15. A vehicle bed cover as set forth in claim 14, including:

a rivet pivotally interconnecting the upper end of said lower arm and the lower end of said upper arm.

16. A vehicle bed cover as set forth in claim 1, wherein:

said lower end of said lower arm is detachably connected with said vehicle bed mounting bracket; and said upper end of said upper arm is detachably connected with said vehicle cover mounting bracket, such that said prop assembly may be easily removed from both said cover and the vehicle.

17. A vehicle bed cover as set forth in claim 1, wherein:

said prop assembly defines a first prop assembly positioned on one side of the vehicle adjacent to said opposite end of said cover; and including
 a second prop assembly, substantially identical to said first prop assembly, and positioned on an opposite side of the vehicle adjacent to said opposite end of said cover.

18. A vehicle bed cover as set forth in claim 17, wherein:

said first and second prop assemblies are non-handed and interchangeable for use on either side of the vehicle.

19. A vehicle bed cover as set forth in claim 1, wherein:

said lower arm has a square tubular lateral cross-sectional configuration with a predetermined width; and said upper arm has a square tubular lateral cross-sectional configuration with a predetermined width that is smaller than the predetermined width of said lower arm, such that the lower end of said upper arm is received within the upper end of said lower arm.

20. A prop assembly for vehicle bed covers of the type shaped to selectively cover an open bed portion of a vehicle, with one end thereof pivotally connected with the vehicle to permit shifting the cover between open and closed positions, and an opposite end thereof with a releasable latch to selectively secure the cover to the vehicle in the closed position, said prop assembly comprising:

a lower arm having a generally L-shaped side elevational configuration, a tubular construction, upper and lower ends, and a first spring mount disposed a predetermined distance between the upper and lower ends of said lower arm;

an upper arm having a generally straight side elevational configuration, a tubular construction, upper and lower ends, and a second spring mount disposed a predetermined distance between the upper and lower ends of said upper arm; said lower end of said upper arm being pivotally connected with the upper end of said lower arm in a manner which positions said upper and lower arms in a vertically aligned relationship;

a vehicle bed mounting bracket configured for connection with the vehicle, and pivotally connected with the lower end of said lower arm;

a vehicle cover mounting bracket configured for connection with the cover, and pivotally connected with the upper end of said upper arm; and a longitudinally extending spring disposed in a vertically aligned relationship with said lower and upper arms, and having one end thereof pivotally connected with said first spring mount, and an opposite end thereof pivotally connected with said second spring mount, whereby outwardly extending biasing force generated by said spring assists in lifting the cover from the closed position, and retains the cover in the open position.

21. A prop assembly as set forth in claim 20, wherein:

said lower end of said upper arm and said upper end of said lower arm are configured to define a clevis joint.

22. A prop assembly as set forth in claim 21, wherein:

said lower end of said lower arm is detachably connected with said vehicle bed mounting bracket; and said upper end of said upper arm is detachably connected with said vehicle cover mounting bracket, such that said prop assembly may be easily removed from both the cover and the vehicle.

23. A prop assembly as set forth in claim 22, wherein:

said lower and upper arms have a non-handed and interchangeable construction for use of said prop assembly on either side of the vehicle.

24. A prop assembly as set forth in claim 23, wherein:

said lower arm has a square tubular lateral cross-sectional configuration with a predetermined width; and said upper arm has a square tubular lateral cross-sectional configuration with a predetermined width that is smaller than the predetermined width of said lower arm, such that the lower end of said upper arm is received within the upper end of said lower arm.

25. A prop assembly as set forth in claim 24, wherein:

said opposite ends of said spring are detachably connected with said first and second spring mounts.

26. A prop assembly as set forth in claim 25, wherein:

said lower end of said lower arm includes a first mounting aperture extending laterally through opposite sidewalls thereof; and said vehicle bed mounting bracket comprises a laterally extending pin closely received in said first mounting aperture in said lower arm, with a detachable retainer mounted on said pin adjacent a free end thereof.

27. A prop assembly as set forth in claim 26, wherein:

said upper end of said upper arm includes a second mounting aperture extending laterally through opposite sidewalls thereof; and said vehicle cover mounting bracket comprises a laterally extending pin closely received in said second mounting aperture in said upper arm, with a detachable retainer mounted on said pin adjacent a free end thereof.

28. A prop assembly as set forth in claim 27, wherein:

said lower arm includes first and second portions mutually oriented at an obtuse included angle at a juncture, wherein said first portion is pivotally connected with said vehicle bed mounting bracket, and said second portion is pivotally connected with the lower end of said upper arm; and said first spring mount is disposed on said first portion a predetermined distance between said juncture and the lower end of said lower arm.

29. A prop assembly as set forth in claim 28, wherein:

said first spring mount is disposed a first distance from said juncture and a second distance from the lower end of said lower arm; and said first distance is in the range of 10–25 percent of the second distance.

30. A prop assembly as set forth in claim 29, wherein:

said second spring mount is disposed a predetermined spaced apart distance from the upper end of said upper arm; and said predetermined spaced apart distance between said second spring mount and the upper end of said upper arm is in the range of 1–2 inches.

* * * * *